March 19, 1957

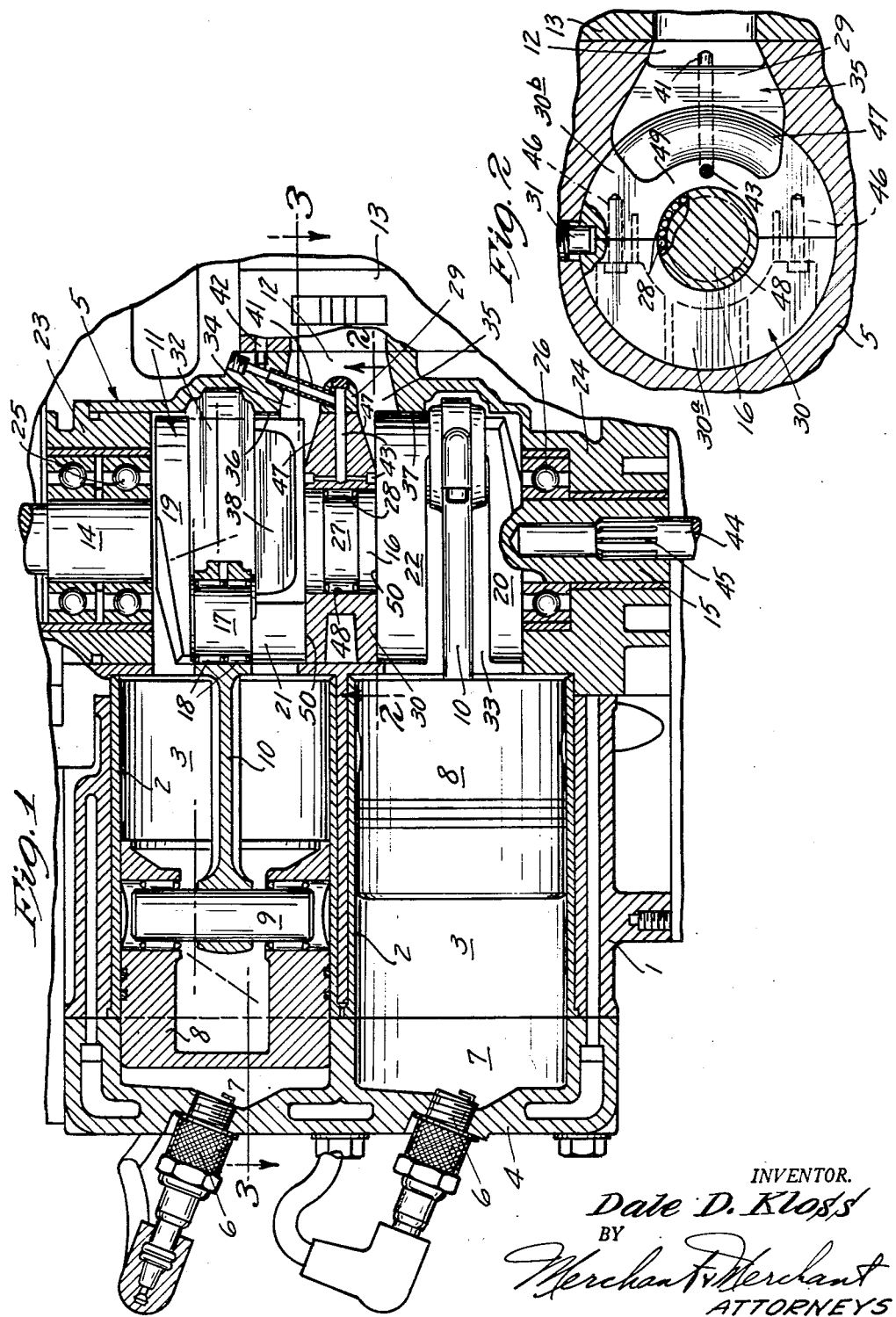

D. D. KLOSS 2,785,665

CENTER MAIN BEARING AND PRESSURE SEAL FOR
INTERNAL COMBUSTION ENGINES
WITH CRANKCASE COMPRESSION

Filed Aug. 1, 1956

INVENTOR.
Dale D. Kloss
BY
Merchant & Merchant
ATTORNEYS

United States Patent Office 2,785,665
Patented Mar. 19, 1957

2,785,665

CENTER MAIN BEARING AND PRESSURE SEAL FOR INTERNAL COMBUSTION ENGINES WITH CRANKCASE COMPRESSION

Dale D. Kloss, Minneapolis, Minn., assignor to Champion Motors Company, Minneapolis, Minn., a corporation of Minnesota Application August 1, 1956, Serial No. 601,537

3 Claims. (Cl. 123—59)

My invention relates generally to improvements in internal combustion engines, and more particularly to improvements in crankshaft bearing and rotary valve seal construction, for two-cycle internal combustion engines.

In two-cycle internal combustion engines having two cylinders in side by side relationship and commonly known as the alternate firing variety, the crankshaft is usually supported at a main journal between the connecting rod journals thereof by a central bearing fixed to the crankcase or motor block, and commonly known as a center main bearing. This bearing supports the crankshaft against radial loads as well as axial thrust, and is also utilized to provide a pressure seal between crank chambers each respectively associated with a different cylinder and through which gaseous fuel is transferred under pressure to their respective combustion chambers from the carburetor.

Heretofore, difficulty has been experienced in obtaining a center main bearing and crankshaft construction which provides an adequate seal and which permits relatively free rotation of the crankshaft at a nominal cost and without a great deal of careful machining and fitting of many parts, wherein relatively small machining errors are often additive to provide an unsatisfactory assembly.

An important object of my invention is the provision of a highly simplified bearing and shaft construction for internal combustion engines of the type set forth, which provides an effective pressure seal between associated crank chambers, and in which friction between relatively moving parts is reduced to a minimum. To this end, I provide a bearing mounted in the crankcase and having an opening for reception of a journal portion of the crankshaft, the crankshaft having a flange, one annular surface of which engages a cooperating annular surface of the bearing to provide a pressure seal and thrust bearing. The cylindrical wall surface of said opening is relatively hard and forms the outer race for a plurality of antifriction bearing elements, interposed therein. In order to achieve an effective pressure seal with a minimum of friction between said annular bearing surfaces, one thereof is relatively hard, while the other thereof is covered with a thin plating of suitable bearing metal which is relatively soft and which slides freely on said relatively hard annular surface.

The above, and still further highly important objects and advantages of my invention, will become apparent from the following detailed specification, appended claims, and attached drawings.

Referring to the drawings, which illustrate the invention, and in which like reference characters indicate like parts throughout the several views:

Fig. 1 is a fragmentary view in axial section of a two-cylinder internal combustion engine of the two-cycle variety;

Fig. 2 is a fragmentary transverse section taken substantially on the line 2—2 of Fig. 1.

Figure 3:
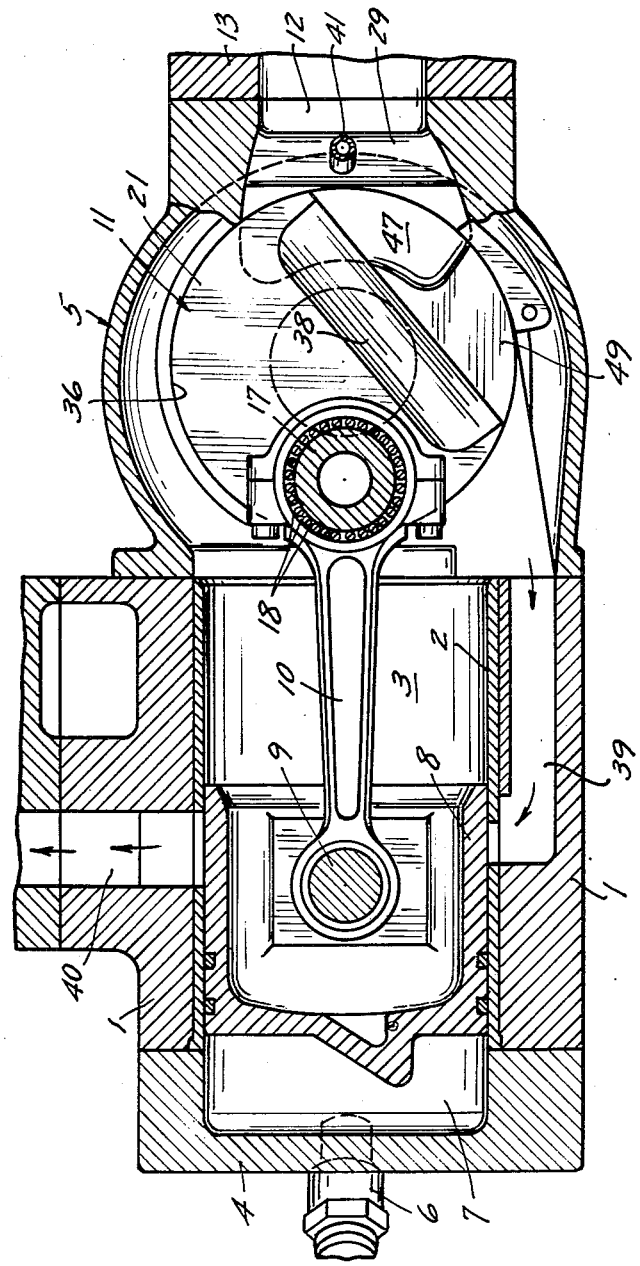
Fig. 3 is a transverse section taken substantially on the line 3—3 of Fig. 1.

Referring with greater detail to the drawings, a two-cycle internal combustion engine is shown as comprising an engine block 1 that is bolted to receive cylinder sleeves 2 which define cylinder 3, a cylinder head 4 bolted to one end of the block 1, and a crankcase 5 bolted or otherwise rigidly secured to the opposite end of the block 1. The engine is provided with a conventional ignition system including a pair of spark plugs 6, one for each of the combustion chambers 7 defined by the cylinder head 4 and overlying the cylinders 3. As shown in Fig. 1, the cylinders 3 are preferably disposed in side by side relationship, the engine being generally known as alternate firing. A pair of pistons 8 are mounted one each in each of the cylinders 3 and are provided with the usual wrist pins 9, one of which is shown, and connecting rods 10 the upper ends of which are connected to their respective wrist pins 9, and the lower ends of which are operatively coupled to a crankshaft indicated generally at 11. The side of the crankcase 5 opposite the engine block 1 defines an inlet port 12 for the passage of gaseous fuel from the usual carburetor, indicated fragmentarily at 13. The carburetor 13 may be any one of a number commonly used in connection with internal combustion engines and may be assumed to be bolted or otherwise rigidly secured to the crankcase 5. Inasmuch as the carburetor does not comprise the instant invention, detailed showing and description thereof are omitted in the interests of brevity.

The crankshaft 11 comprises axially aligned upper and lower end main journals 14 and 15 respectively and a center main journal 16, and spaced connecting rod journals 17 each of which is operatively coupled to a different one of the connecting rods 10 by means of needle bearing or the like 18. While only one of the connecting rod journals 17 is shown, it may be assumed that the other thereof is identical thereto. The connecting rod journals 17 of the crankshaft 11 are connected to their respective end main journals 14 and 15 by crank arms 19 and 20 respectively, and to opposite ends of the center main journal 16 by segmental valve acting flanges 21 and 22 respectively. The end main journals 14 and 15 are mounted in respective bearing bosses 23 and 24 at opposite ends of the crankcase 5 by means of antifriction bearings 25 and 26 respectively. The center main journal 16 is formed to provide a circumferential channel or inner race 27 for the reception of antifriction needle bearings 28.

The central portion 29 of the crankcase 5 is bored to receive an annular center main bearing 30 that is anchored against movement by a set screw or the like 31, see Fig. 2. The crankcase portion 29 and center main bearing 30 divide the interior of the crankcase 5 into upper and lower crank chambers 32 and 33 respectively, each being adapted to receive fuel from the carburetor 13 through the inlet port 12 and passages 34 and 35 communicating with the port 12 and their respective crank chambers 32 and 33.

The segmental flanges 21 and 22 are contained in aligned bores 36 and 37 respectively in the crankcase 5 with an easy running fit between the circumferential surfaces of the said flanges and of respective bores 36 and 37. Each flange 21 and 22 is cut away as indicated at 38 whereby to periodically expose their respective crank chambers 32 and 33 to the inlet port 12 through their respective inlet passages 34 and 35. Although only the cut-away portion 38 of the flange 21 is shown, it may be assumed that the flange 22 is provided with a similar cut-away portion diametrically opposite that of the flange 21. The cut-away portions 38 are so relatively disposed to their respective crank journal 17 that, upon movement of their respective pistons 8 toward the cylinder head 4, the crank chambers 32 and 33 are alternately caused to be subjected to subatmospheric pressure whereby fuel is drawn thereinto from the carburetor 13. Thereafter, upon downward movement of the piston 8 toward the crankcase 5, the cut-away portions 38 are moved out of register with their respective passages 34 and 35, and the crank chambers 32 and 33 are subjected to pressure above atmospheric pressure. With reference to Fig. 3, it will be seen that the block 1 is provided with intake passages 39, one of which is shown, through which gaseous fuel moves from the crankcase chambers to their respective combustion chambers 7 when their respective pistons 8 are moved to their limit of movement toward the crankcase 5. Exhaust passages 40, one of which is shown, are provided in diametrically opposed relation to the intake passages 39, for the removal of gases of combustion. The passages 39 and 40 are commonly found in two-cycle internal combustion engines. Hence, only one each thereof is shown. A conduit 41 communicates with passage means 42 in the carriage 13 and other passage means 43 in the center main bearing 30 to conduct fuel alternately to the crank chambers 32 and 33 when the engine is running at idling speed. A drive shaft 44 has its upper end connected to the lower main crankshaft journal portion 15 by a spline connection or the like 45. Inasmuch as the engine illustrated is intended for use as an outboard motor for boats and the like, it may be assumed that the drive shaft 44 is adapted to be connected to the usual propeller not shown.

In engines of the type above described, when the same is in operation, each of the crank chambers 32 and 33 is under subatmospheric pressure when the other thereof is under pressure greater than atmospheric pressure. Hence, it is necessary that a pressure seal be mounted between the valve acting flanges 21 and 22 and the center main bearing 30 to prevent leakage of gas therethrough from one of the crank chambers to the other thereof. Furthermore, while providing said pressure seal, it is also desirable that friction between the valve acting flanges and the center main bearing 30 be kept at a minimum, inasmuch as the center main bearing 30 is utilized not only to carry a portion of the radial load exerted pressure upon the crankshaft 11, but also to carry the axial load of the crankshaft 11. The center main bearing 30 is preferably made from relatively hard metal such as cast iron or steel and, as shown in Fig. 2, is split to provide bearing sections 30a and 30b said sections being secured together by machine bolts or the like 46 shown by dotted lines in Fig. 2. The bearing section 30b is provided with chamfered or tapered surfaces 47 which define portions of the inlet passages 34 and 25, see Fig. 1. The center main bearing 30 defines a central opening 48 concentric with the journal 16, and which provides a relatively hard circumferential wall or outer race that engages the needle bearing 28. Thus, the needle bearing 28 cooperates with the antifriction bearings 25 and 26 to support the crankshaft 11 against radial load and permit free running of the crankshaft 11.

For the purpose of enhancing the pressure seal between the center main bearing 30 and the adjacent crankshaft flanges 21 and 22, and for reducing friction between the opposite annular bearing faces 49 of the center main bearing 30 and the adjacent surfaces or cheeks 50 of the flanges 21 and 22, I apply a thin plating of relatively soft bearing metal to one of each engaged pair of said surfaces, preferably the annular surfaces 49 of the center main bearing 30. The bearing metal may be, if desired, one of any number of relatively soft metals suitable for sleeve bearings and the like, but preferably of an alloy containing approximately 22 percent tin. This plating cooperates very satisfactorily with the adjacent surfaces 50 of the relatively hard steel flanges 21 and 22 of the crankshaft 5 for easy running contact therewith, and requires but a minimum of so called "break-in" time. The relative softness of the plating permits the same to flow into and fill any minute unevenness in the surfaces 49 of the bearing 30 such as might occur between the split sections 30a and 30b thereof during the break-in period, and a highly effective pressure seal and smooth running operation is thus obtained. Inasmuch as the circumferential inner wall 48 of the center bearing 30 and the surface of the channel 27 are relatively hard there is no necessity for utilizing separate hardened bearing races for engagement with the needle bearings 28. Thus, by using a central main bearing made from relatively hard material and applying a relatively soft metal plating to the opposite faces 49 thereof for engagement with the relatively hard face surfaces 50 of the crankshaft flanges 21 and 22, the number of machined parts is reduced to a minimum, the reduced number of parts causing a consequent reduction in the number of close machining tolerances which otherwise need to be observed.

It is well known among those skilled in the art that, where several cooperating machined parts are used in an assembled mechanism, machining tolerances are apt to be additive to the point where assembly may be difficult, or wherein actual misalignment of parts may occur, unless the tolerances are held to a point which makes for expensive machining. My novel structure has overcome these objections in a simple and inexpensive manner.

While I have shown and described a commercial embodiment of my novel structure and arrangement of parts, it will be understood that the same is capable of modification without departure from the spirit and scope of the invention as defined in the claims.

What I claim is:

1. In a multicylinder two-cycle internal combustion engine having a crankcase and a crankshaft mounted therein, said crankshaft including a journal and a pair of axially spaced flanges each at an opposite end of said journal, a bearing mounted in said crankcase between said flanges and having an opening therethrough concentric with said journal, said bearing providing a partition in said crankcase and cooperating with said crankcase to define separate crank chambers which are subjected alternately to subatmospheric pressure and to pressure greater than atmospheric pressure and through which gaseous fuel is delivered to combustion chambers of said engine, said bearing opening being defined by a relatively hard circumferential wall surface providing an outer bearing race, and antifriction bearing elements interposed between said outer race and said journal for carrying the radial load of said shaft, opposite ends of said bearing defining flat smooth annular surfaces, said flanges defining opposed flat cheek surfaces each engaging an adjacent one of the annular surfaces on said bearing to provide a pressure seal, one surface of each engaged pair thereof being relatively hard, the other surface of each engaged pair thereof being covered by a plating of relatively soft metal for receiving axial thrust between said adjacent cooperating surfaces.

2. In a multicylinder two-cycle internal combustion engine having a crankcase and a crankshaft mounted in said crankcase, said crankshaft including a journal and a pair of axially spaced segmental flanges at opposite ends of said journal, and a bearing mounted in said crankcase and having an opening therethrough concentric with said journal said opening being defined by a relatively hard circumferential wall surface providing an outer bearing race, and antifriction bearing elements interposed between said outer race and said journal for carrying the radial load of said shaft, said bearing providing a partition in said crankcase and cooperating with said crankcase to define separate crank chambers each communicating with a different combustion chamber in said engine, said crankcase defining a fuel inlet port common to both of said crank chambers, said chambers being subjected alternately to subatmospheric pressure and to pressure greater than atmospheric pressure, said segmental flanges on the crankshaft providing valves governing the flow of gaseous fuel from said inlet port alternately to said crank chambers, opposite ends of said bearing defining smooth annular surfaces, said segmental flanges defining opposed cheek surfaces each engaging an adjacent one of the annular surfaces on said bearing to provide a pressure seal between said chambers, one surface of each engaged pair thereof being relatively hard, the other surface of each engaged pair thereof being covered by a plating of relatively soft metal for receiving axial thrust between said cooperating surfaces.

3. In a two-cylinder two-cycle internal combustion engine having a crankcase and a crankshaft mounted in said crankcase, said crankshaft including a journal and a pair of axially spaced segmental flanges at opposite ends of said journal and a bearing mounted in said crankcase and having an opening therethrough concentric with said journal, said opening being defined by a relatively hard circumferential wall surface providing an outer bearing race, and antifriction bearing elements interposed between said outer race and said journal for carrying the radial load of said shaft, said bearing providing a partition for said crankcase and cooperating with said crankcase to define separate crank chambers each communicating with a different combustion chamber in said engine, said crankcase defining a fuel inlet port common to both of said crank chambers, said chambers being subjected alternately to subatmospheric pressure and to pressure greater than atmospheric pressure, said segmental flanges on the crankshaft providing valves governing the flow of gaseous fuel from said inlet port alternately to said crank chambers, opposite ends of said bearing defining smooth annular surfaces, said segmental flanges defining opposed cheek surfaces each engaging an adjacent one of the annular surfaces on said bearing to provide a pressure seal between said chambers, the bearing-engaging cheek surfaces of said crankshaft being relatively hard, the cooperating annular surfaces on said bearing being covered by a plating of relatively soft metal for receiving axial thrust between said cheek surfaces and said annular surfaces.

References Cited in the file of this patent

UNITED STATES PATENTS

| 1,845,702 | Evinrude | Feb. 16, 1932 |
| 1,978,214 | McBride | Oct. 23, 1934 |
| 2,185,506 | Johnson | Jan. 2, 1940 |
| 2,513,699 | Phelps | Nov. 28, 1950 |

FOREIGN PATENTS

| 204,948 | Great Britain | Oct. 11, 1923 |
| 627,654 | Germany | Mar. 20, 1936 |